Figure 7:
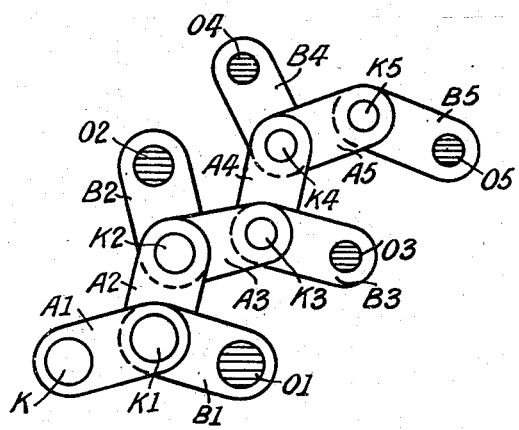

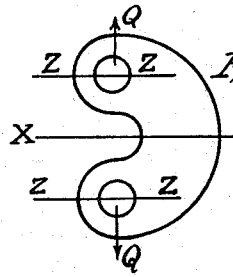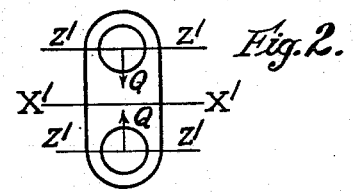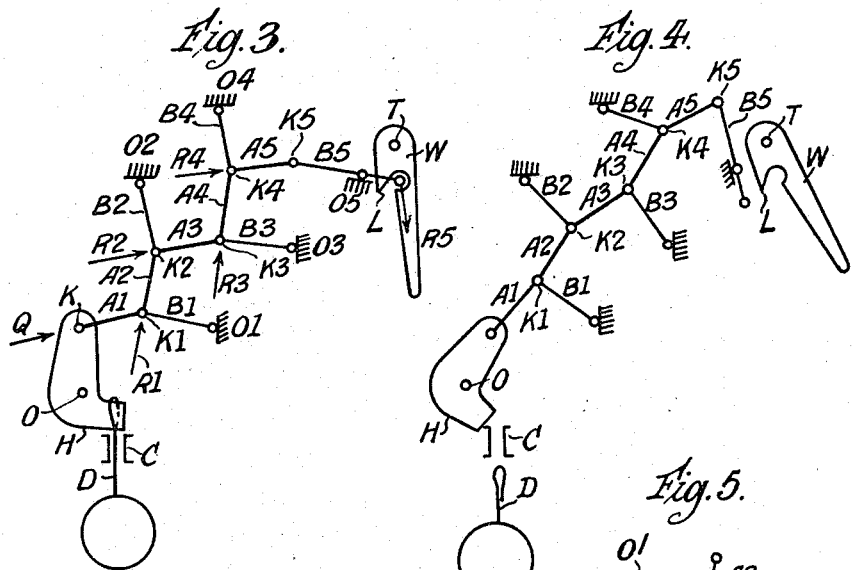

Patented Feb. 12, 1946

2,394,571

UNITED STATES PATENT OFFICE 2,394,571

DEVICE FOR RELEASING HEAVY OBJECTS, PARTICULARLY FOR DROPPING BOMBS FROM AIRCRAFT

Wladyslaw Swiatecki, Blackpool, England; Rosa Swiatecka administratrix of said Wladyslaw Swiatecki, deceased Application October 16, 1942, Serial No. 462,298
In Great Britain November 8, 1941

8 Claims. (Cl. 89—1.5)

The invention relates to devices for releasing heavy objects, and is more particularly directed to the purpose of dropping bombs from aircraft. In my prior British patent specification No. 369,397 I disclosed a device for this purpose in which the releasing force for heavy bombs was reduced to any desired extent by means of a cascade connection of links and radius rods. Each element comprised a curved link normally in tension and a radius rod shorter than the link normally in compression and pivoted at a fixed point located between the two ends of the link when the device was in the bomb holding position.

One of the links according to the prior invention is shown in Figure 1 of the accompanying drawings. Due to the position of the pivot of the radius rod this link had to be curved, and the section X—X had to be made large to resist the bending moment due to the tension force Q applied between the eyes of the link. Moreover the material at the sections Z—Z had to be of substantial thickness to withstand the tension due to the weight of the bomb.

It is an object of the present invention to reduce the weight of the links.

The principle by which this is achieved is illustrated by Figure 2 of the same drawings. As will be explained later, the pivot of the radius rod is placed outside the link and the stress on the link is one of compression. Thus the section X'—X' is required to be calculated for compressive stress only, and the sections Z'—Z' carry practically no stress due to the weight of the bomb.

According to the present invention a device for releasing heavy objects, particularly for dropping bombs from aircraft, has the connection between the holding device and the release actuating means constituted as a cascade connection of elements in which each element comprises two rods pivoted together and nearly in line when in the holding position, the force due to the holding of the object acting in a direction to place the rods in compression, and in which the action due to the release actuating means is applied to the common pivot of the two rods.

In most cases one rod of each element is pivoted at a fixed point and may be referred to as a radius rod. The other rod is then a compression link and corresponds in function with the curved tension link of the prior British patent. It may sometimes be desired to alter the position of some elements of the cascade from that which they would have to occupy if the link of one element were connected direct to the common pivot of the next. Then the radius rod may be made in the form of a lever with central fulcrum. The actual connection to the release actuating means or the link of the previous element is at the end of the lever away from the common pivot with its associated link, but none the less the effect of the lever is to transfer the action due to the release actuating means to the common pivot.

Figure 8:
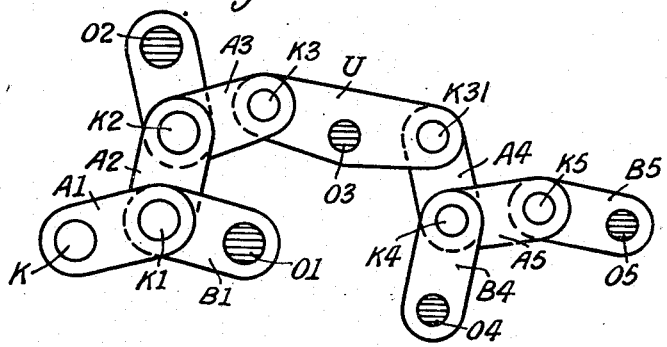

The invention is illustrated and further explained by means of the accompanying drawings, in which Figures 1 and 2, which have already been referred to, are respectively a tension link according to the prior British patent and a compression link according to the present invention, Figure 3 is a diagrammatic representation by way of example of a bomb suspension, release gear and connection according to the invention in the holding position, Figure 4 corresponds to Figure 3 but shows the bomb just released, Figure 5 is a modification of a part of Figure 3, Figure 6 is similar to Figure 3 but shows the inclusion of a lever to modify the position of some of the parts, Figure 7 shows the actual connection system of Figure 3, and Figure 8 shows the actual connection system of Figure 6.

Referring first to Figure 3, the bomb suspension or holding device is shown conventionally as an L-shaped member H pivoted at O. Its horizontal arm passes through the eye D of a bomb located by vertical guides C. The weight of the bomb tends to rotate the device H in a clockwise direction with a force Q indicated by an arrow acting at a point K on the vertical arm of the member H.

The first element of the cascade connection between the device H and the release actuating means comprises a link A1 pivoted to the device H at K and a radius rod B1 pivoted to the link A1 and K1 and by its other end to a fixed point O1. The members A1 and B1 are nearly in line but not quite, so that the force Q places both in compression and gives rise to a small force R1 acting at the common pivot K1 as indicated by the arrow.

The force R1 is similarly resisted by the second element of the cascade comprising the link A2 and radius rod B2 pivoted together at K2. The other end of the link A2 is pivoted to the common pivot K1 of the first element and that of the radius rod B2 is pivoted at a fixed point O2. Again the link and rod are nearly in line but not quite, so that the force R1 applied to the element in a direction to place the members under compression gives rise to a force R2 acting at the pivot K2 as shown by the arrow. The force R2 is smaller still than the force R1.

Again the force R2 is resisted by the third element A3, B3 with the fixed pivot O3 and common pivot K3, at which the still smaller force R3 appears, to be resisted in its turn by a fourth element A4, B4 with pivots K4 and O4 as before. The smaller force R4 is again resisted by the fifth element A5, B5 with the fixed pivot O5 and common pivot K5.

Since in this embodiment the fifth cascade element is the last, a small modification is introduced. The radius rod B5 is continued backwards to form a double-ended lever, the actual holding force being applied at the outer end as indicated by the arrow R5, while the lever transfers the effect of the holding force to the common pivot K5.

The release actuating means is shown conventionally as a manipulatable member such as a lever W pivoted at a fixed point T and provided with a notch in which a pin at the outer end of the lever B5 is adapted to rest. To release the bomb the lever W is swung to the right to the position shown in Figure 4. Then the force R5 tilts the lever B5 to the release position, all the other elements of the cascade following under the effect of the respective forces, so that the horizontal arm of the member H is unthreaded from the eye of the bomb, releasing the latter.

In case the force R5 should be insufficient for any reason to initiate the movement, the other side of the notch in the lever W is formed as a cam surface to push the end of the lever B5 down as the lever W is swung to the right.

The device H could alternatively be constructed as shown in Figure 5 at H'. The pivot O' is at the top and the first link A'1 is connected at the angle.

Although bomb suspension devices and a form of release gear have been described for the sake of completeness, it must be understood that these form no part of the present invention, which resides in the connection between them and can be applied, with minor modifications if necessary, to any bomb suspension device and any form of release gear. The invention may also find other applications than to bomb dropping, in fact wherever an object is held by a large force and it is desired to release it by a small force. One instance is the detachment of a slip coach from a railway train.

Reverting to the connection between a bomb suspension device and the releasing means just described and shown diagrammatically in Figures 3 and 4, the actual connection is shown in Figure 7. The progressive reduction in the dimensions of the parts from the bomb end to the releasing means end will be noted, as also the economy of material in the links and radius rods nearer the bomb end, as indicated in Figure 2.

In some aircraft there may not be sufficient height to accommodate the connection shown in Figure 7. In this case a small modification may be adopted as shown in outline in Figure 8 and as a line diagram in Figure 6.

The elements A1, B1 and A2, B2 are as shown in Figures 3 and 7. In the next element the link A3 is as before, but the radius rod B3 is replaced by a two-armed lever U pivoted at O3. The weight of a suspended bomb causes an upward thrust at the pivot K3, which is transformed by the lever U into a downward thrust at the other end of the lever. Here the next element A4, B4 is attached by a pivot K31 and is as shown in Figures 3 and 7 except that it extends downwards. The last element A5, B5, is as previously described. Any other radius rod or more than one could be made in the form of a lever like U. In fact, the radius rod B5 in Figure 3 is so constructed to suit the particular form of release actuating means shown.

What I claim is:

1. A device for releasing heavy objects, particularly for dropping bombs from aircraft, comprising means for directly supporting the bomb mounted on a fixed part of said craft and being movable to a position to release the bomb under the weight of the bomb; means for maintaining said first means in bomb supporting position; said second means including a linkage consisting of a pair of pivotally connected rods, one of the rods being pivotally connected to a fixed point and the other of the rods being pivotally connected to the first-named means; the arrangement being such that the rods in holding position are nearly in line, and further such that the rods are placed under compressive stress by the weight of the bomb acting on said first-named means; a second linkage consisting of two pivotally connecting rods one of which is pivotally connected to first-named linkage and the other of which is pivotally connected to a fixed point on said craft, the disposition of said second linkage being such that said rods are in substantial alignment when the rods of first-named linkage are in that position, and a mechanism for releasably holding the rods of said second linkage in substantial alignment.

2. A device for releasing heavy objects according to claim 1, including a lever having a fixed axis, a link pivotally connected to the first-named linkage, said lever on one side of its axis being pivotally connected to said link, and said lever on the other side of its pivotal axis being connected to said second linkage.

3. A device for releasing heavy objects according to claim 1, wherein one of the rods of the second linkage is a lever and has an extension beyond its axis on the side opposite to its connection to the adjacent rod, and wherein said mechanism has a releasing element directly engaging said extension.

4. A device for releasing heavy objects, particularly for dropping bombs from aircraft, comprising holding means for releasably holding the object and being so biased as to tend to move due to the weight of the object; and releasable means for maintaining said holding means in object supporting position comprising a first pair of rods pivoted together and normally nearly in line with each other, one of said rods being also pivoted to a fixed point and the other of said rods being pivoted to said holding means in such a location as to resist the force due to the weight of the object by compressive stress in the rods, and another pair of rods pivoted together and normally nearly in line with each other, one of the rods of said other pair being also pivoted to a fixed point and the other rod of said other pair being in pivotal relation to said first pair of rods for holding the rods of said first pair in their normally nearly aligned positions and to resist the force due to the weight of the object by compressive stress in the rods of said other pair.

5. A modification of the device in accordance with claim 4 in which at least one pair of rods has the first named rod thereof provided with an extension beyond the fixed pivot in a direction away from the common pivot and the member which applies the holding force engages the outer end of the extension.

6. A device for releasing heavy objects, particularly for releasing bombs from aircraft, comprising means for releasably holding the object and being so biased that a point on said means tends to move due to the weight of the object; and releasable means for maintaining said holding means in object supporting position comprising a manipulatable member, and a cascade connection of elements between said holding means and said member, each of the elements of said cascade connection comprising two rods pivoted together and a rod support, the rods being nearly in line with each other when in holding position, the first element nearest to the holding means being linked to said holding means at said point thereon by the end of one rod and having a point on the other rod mounted on said support to resist the buckling force due to the weight of the object by compression stress in both rods, the next element in the cascade connection being connected in pivotal relation to the rods of said first mentioned element to resist the buckling force acting on the rods of said first element or to permit said force to act according to the position of said manipulatable member, said elements being connected one to another in the same way as said first element is connected to said holding means.

7. A device as defined in claim 6 and in which the rod supports included in the elements of the cascade connection comprise fixed pivots for the rods respectively mounted thereon.

8. A device as defined in claim 6 and in which the rod support of the element of the cascade connection most remote from said holding means comprises a fixed pivot for the support-mounted rod of that element, said support-mounted rod extending from its pivotal connection to the other rod of the element beyond said fixed pivot to constitute a double-ended lever having an extended end, the second means being engageable with the extended end of said lever.

WLADYSLAW SWIATECKI.